Patented Nov. 22, 1938

2,137,492

UNITED STATES PATENT OFFICE 2,137,492

PROCESS OF POLYMERIZING UNSATURATED HYDROCARBONS CONTAINING DIOLEFINES

Julius Hyman, Chicago, Ill., assignor to Velsicol Corporation, Chicago, Ill., a corporation of Illinois No Drawing. Application May 25, 1936, Serial No. 81,685

6 Claims. (Cl. 260—2)

This invention relates to the preparation and use of granular contact catalysts in the manufacture of mineral drying oils and solid resinous bodies by the treatment of unsaturated hydrocarbon vapors.

It has long been known that diatomaceous earth and other naturally occurring adsorbent earths possess the property of polymerizing highly unsaturated hydrocarbons in vapor phase to form oleo-resinous polymeric substances which, when reduced by heat or evaporation, have to a greater or lesser degree, the property of absorbing oxygen from the air and thereby solidifying somewhat after the manner of the vegetable and marine drying oils. Such a polymerization process is carried out at vapor temperatures ranging between about 100° F. and 450° F.

I have found that certain solid, porous synthetic silicates possess such superior catalytic activity toward unsaturated hydrocarbons containing appreciable amounts of diolefines than the natural granular catalysts. These synthetic compounds are silicates of polyvalent metallic ions; and, in general, those polyvalent metallic ions possessing the highest ionic potentials produce the most active catalysts. The ionic potential is defined by the expression $$\sqrt{\frac{C}{r}}$$

where "C" represents the ionic charge, or electron deficiency per atom, and "$r$" the ionic radius, expressed in Ångström units. Thus the aluminium and beryllium ions, both of which possess high ionic potentials, are very effective in producing highly active synthetic silicate catalysts. In contrast with these porous polyvalent metallic silicates, plain silica gel possesses a very slight activity, and its use in this invention is not contemplated.

As active catalysts, only those synthetic silicates seem useable whose porosity is sufficient to permit entrance of the unsaturated hydrocarbons and egress of the polymers. This porosity is reflected in the apparent density of the catalyst, the lower the apparent density the greater being the porosity. Because of the differences in the combining weights and the amounts of the metallic ions combined with the silicates it is not possible to give a maximum apparent density for active metallic silicates as a whole. Tests which I have made indicate that the maximum apparent density of an active synthetic aluminium silicate bearing a molecular ratio of alumina to silica of approximately 1 to 7 is less than 60 pounds per cubic foot, the apparent weight being defined as the weight of a cubic foot of unpacked material which is dry to the touch and has a screen size between 8 and 80 mesh, over 50% of which being of a screen size between 30 and 60 mesh. The atomic ratio of polyvalent metallic ion to silicon should lie between 1 to 2 and 1 to 20 for most satisfactory results from a standpoint of catalytic activity combined with physical strength.

It appears that silicates precipitated as gels in an alkaline solution show a greater porosity than those precipitated from a neutral solution. Acid solutions appear to decrease the porosity still further.

Silicates precipitated in an alkaline solution usually possess base-exchange, or zeolite, properties to a greater or lesser degree. Such silicates must be freed of water-soluble alkali before they will function as catalysts for the polymerization of unsaturated hydrocarbons. This may be accomplished, for example, by washing or boiling the granular silicate with an aqueous solution of a salt of a polyvalent metallic ion, said ion comprising the cation of the salt, until all accessible alkali has been neutralized. Or in the case of metallo-silicates, it may be accomplished by washing the silicate with an aqueous solution of an ammonium salt, washing out the excess of the salt, and heating the treated silicate to break down the ammonium metallic silicate complex and drive off the liberated ammonia. In treating synthetic zeolites to function as catalysts, it is well first to wash away with water as much alkali and occluded salts as conveniently possible.

If the silicate is precipitated in a neutral or an acid solution, the porosity may be increased, for example, by allowing the gel to dry while admixed with a quantity of a water-soluble salt. This salt is leached away from the silicate when the gel has set and dried.

It appears further that, of the various possible polyvalent metallic ions available, the use of those whose sulfides are not dark-colored is preferred. For example, experiments carried out by me indicate that polymers resulting from the treatment of highly unsaturated hydrocarbon vapors of the gasoline boiling range with porous granular iron and copper aluminosilicates are exceedingly dark in color, to their detriment from a sales standpoint. On the other hand, metallic ion silicates such as those of aluminium, beryllium, magnesium and calcium produce polymers of lower tinctorial power.

Active synthetic silicates have been prepared which show from twice to six times the polymerizing activity of a good grade of fuller's earth. The synthetic silicates may be reactivated to some extent by washing with appropriate solvents, or they may be reactivated by calcining at a very dull red heat in the presence of oxygen. The adhering carbonaceous material disappears, leaving the silicate with a gentler but still very impressive activity. Reactivation by calcining may be conducted repeatedly, and polymers derived from calcined silicates show less tinctorial power than those derived from uncalcined silicates.

In order to prolong the life of the synthetic granular silicate catalyst and also to improve the color of the polymers made therefrom, it may be found advisable to pretreat the unsaturated hydrocarbon vapors with a milder polymerizing catalyst, such as acid-treated fuller's earth or a calcined active silicate. Such multiple treatment in general does not seem to reduce the total combined yield of polymer, and is to be recommended where paleness of the crude polymer product is desired.

I claim as my invention:

1. In the polymerizing treatment of unsaturated hydrocarbon vapors containing diolefines, the step which comprises subjecting said vapors to the action of a granular catalyst resulting from the treatment of a synthetic ammonium aluminium zeolite under sufficient heat to break down the ammonium complex, and then driving off the liberated ammonia.

2. In the polymerizing treatment of unsaturated hydrocarbon vapors containing diolefines, the step which comprises subjecting said vapors to the action of a synthetic zeolite substantially free of water-soluble alkali, the base exchange component of which has been replaced by aluminium ion.

3. In the polymerizing treatment of unsaturated hydrocarbon vapors containing diolefines, the step which comprises subjecting said vapors to the action of a solid, porous, synthetic silicate of a polyvalent metallic ion comprising essentially aluminium ion.

4. In the polymerizing treatment of unsaturated hydrocarbon vapors containing diolefines the step which comprises subjecting said vapors to the action of a synthetic zeolite, the base-exchange component of which having been replaced by aluminium ion.

5. In the polymerizing treatment of unsaturated hydrocarbon vapors containing diolefines, the step which comprises subjecting said vapors to the action of solid, porous, synthetic aluminium silicate.

6. In the polymerizing treatment of unsaturated hydrocarbon vapors containing diolefines, the step which comprises subjecting said vapors to the action of a granular, porous, synthetic complex silicate comprising aluminium ion.

JULIUS HYMAN.